(Model.)

F. T. PINTER.
PLOW.

No. 288,734. Patented Nov. 20, 1883.

Witnesses
Louis F. Gardner
W. H. Kern

Inventor.
F. T. Pinter,
per
F. A. Lehmann
Atty

UNITED STATES PATENT OFFICE.

FRANCIS T. PINTER, OF SCHULENBURG, TEXAS.

PLOW.

SPECIFICATION forming part of Letters Patent No. 288,734, dated November 20, 1883.

Application filed August 28, 1882. (Model.)

*To all whom it may concern:*

Be it known that I, FRANCIS T. PINTER, of Schulenburg, in the county of Fayette and State of Texas, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists, first, in the combination of an adjustable support which is pivoted to the side of the beam, and which has secured to its lower end a series of revolving arms which terminate in broad cutters, for cutting the sod as it is turned over by the moldboard as the plow is drawn along; second, in the revolving cutter, which runs along upon the land side and cuts the sod where the next furrow is to be cut, and thus takes the place of the usual colter, which runs in advance of the plow and cuts the sod just as it is about to be turned over; third, in the adjustable clevis attachment, whereby the side attachment can be adjusted vertically, all of which will be more fully described hereinafter.

Figure 1:
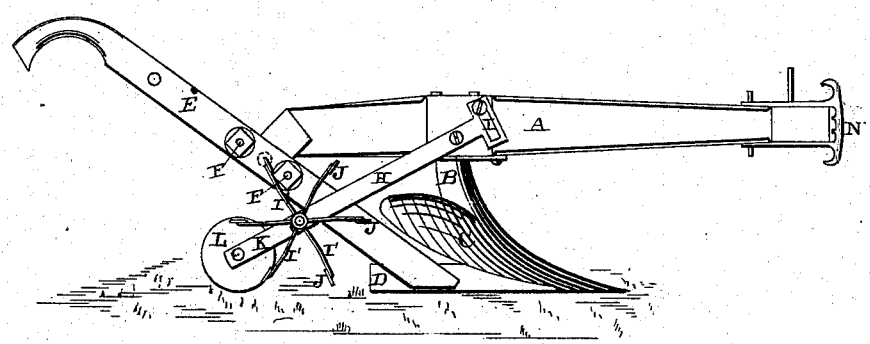
Figure 2:
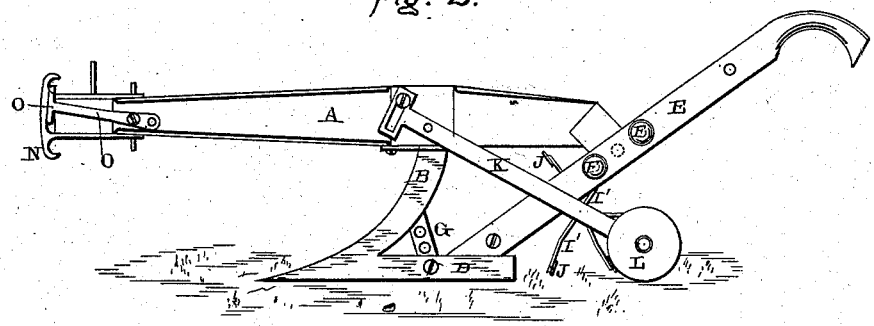
Figure 3:
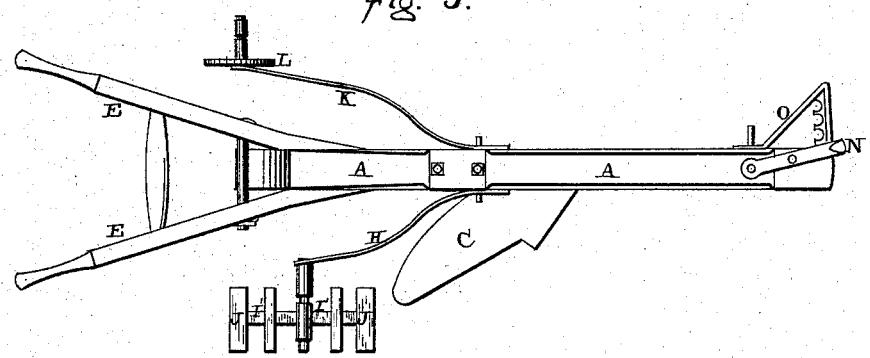

Figures 1 and 2 are side elevations of my invention, taken from opposite sides. Fig. 3 is a plan view.

A represents the beam, B the standard, C the mold-board, D the landside, and E the handles. The rear end of the beam is turned downward at an angle, as shown, and the lower ends of the handles are pivoted to the landside D. The handles branch outward, so as to allow the rear end of the beam to fit in between them, and then the beam is clamped rigidly in place by means of the two clamping-bolts, F. By loosening the nuts upon these clamping-bolts F the hold of the handle upon the beam is loosened, and then the handles can be adjusted back and forth upon the beam, so as to cause the handles to be raised or lowered, and to adapt the plow to be operated by either a tall or short person. Through the rear end of the beam and the handles is made a hole, through which a pin or bolt can be passed, and thus lock the handles rigidly in place. Extending up from the landside D to the standard B is a perforated plate, G, by means of which the lower ends of the handles can be adjusted up and down. In this case the handles will turn upon the pin which is passed through them and the rear end of the beam, and then the clamping-bolts can be dispensed with. By means of this adjustment the rear ends of the handles can be raised and lowered through a considerable portion of a circle.

Pivoted to the side of the beam at any suitable point is the brace H, which is provided with a slot, I, at its upper end, so that its lower end can be adjusted up and down. Journaled upon this lower end, which is turned outward, as shown, is a suitable hub, from which radiate a number of arms, I', which terminate in the wide cutters J. As the plow is drawn along, these cutters run upon the furrow-slice and cut the sod so as to divide it in small pieces. Where the slice is turned over and the sod is in any way heavy or thick, it is very difficult to work the ground afterward, and for this reason a device is used for cutting the slice into small pieces. Secured to the opposite side of the beam is a second adjustable slotted brace, K, which has the revolving colter L pivoted upon its lower end. This brace is so shaped as to extend out from the side of the beam just the width of the furrow that is to be cut, and this colter cuts through the sod, so that there is no colter needed in front of the share for the purpose of cutting the sod. This revolving colter, being attached to the side of the beam, acts both as a guide for the next furrow that is to be cut and to cut the furrow at the same time. The first furrow having been cut, this revolving colter marks the ground for every succeeding furrow that is to be cut, so that the person plowing always has a line by which to guide him.

Attached to the front end of the beam is the usual clevis, N, which is so pivoted that it can be swung from one side to the other at the front end of the beam, in the usual manner. Pivoted to the side of the beam is the draft attachment O, which has a number of points formed upon its inner corner, for catching in the notches in the clevis. As this side attachment is pivoted at its rear end, its front end is formed by moving up and down, according as a deep or shallow furrow is desired.

When it is desired to adjust the side attachment vertically, it is necessary to withdraw one of the pins which hold the clevis in place and swing it laterally out of the way far enough to allow the points upon the side attachment to move freely up and down. As soon as the desired height is reached the clevis is moved laterally, so that the points upon the side attachment shall again engage with it, and then the clevis is again locked in place.

Having thus described my invention, I claim—

1. The combination of the brace H with a wheel composed of the arms I' and the cutters J, substantially as shown.

2. The combination of a plow with the pivoted bent and adjustable arm or brace K, having the colter L journaled on its lower end, whereby the colter is made to run upon one side of the plow and at a suitable distance from it, substantially as described.

3. The combination of the beam A and the clevis N, pivoted thereon, so as to swing laterally, with the side draft, O, having a vertical adjustment, and which has its ends to catch in the clevis, substantially as specified.

4. The combination of a plow with the pivoted bent arm K, having the colter L secured to its lower end, whereby the colter is made to cut the width of the next furrow, substantially as shown.

In testimony whereof I affix my signature in presence of two witnesses.

FRANCIS T. PINTER.

Witnesses:
   J. W. QUEBEDAUX,
   W. J. KOHLHAUFF.